United States Patent [19]

Uhl

[11] 4,441,726
[45] Apr. 10, 1984

[54] HEAT AND VIBRATION RESISTANT SEAL

[75] Inventor: Larry A. Uhl, Sandusky, Ohio

[73] Assignee: Shan-Rod, Inc., Huron, Ohio

[21] Appl. No.: 330,192

[22] Filed: Dec. 14, 1981

[51] Int. Cl.³ .......................................... F16J 15/16
[52] U.S. Cl. .................................. 277/230; 277/234
[58] Field of Search .................. 277/230, 234, 235 A,
277/228, 237 R

[56] References Cited

U.S. PATENT DOCUMENTS

| | | |
|---|---|---|
| 2,144,082 | 1/1939 | Pandall . |
| 2,882,082 | 4/1959 | Poltorak et al. . |
| 2,924,471 | 2/1960 | Poltorak et al. . |
| 3,033,722 | 5/1962 | Goodloe . |
| 3,481,824 | 12/1969 | Poltorak . |
| 3,519,282 | 7/1970 | Davis . |
| 3,534,652 | 10/1970 | Zumeta et al. . |
| 3,578,764 | 5/1971 | Nunnally et al. . |
| 4,065,138 | 12/1977 | Seuerinsen . |
| 4,220,342 | 9/1980 | Shah . |

FOREIGN PATENT DOCUMENTS 690906  4/1953  United Kingdom ................ 277/230

*Primary Examiner*—Robert I. Smith
*Attorney, Agent, or Firm*—Robert R. Hussey Co.

[57] ABSTRACT

A heat and vibration resistant seal construction for a valve assembly having a core member constructed of a dense, resilient material which retains its spring-like properties at elevated service temperatures. The core is surrounded by an intermediate wrap member of braided, ceramic fiber forming a co-extensive cover for the core member. Lastly, an outer wrap member constructed of braided wire metal mesh is provided around the intermediate wrap member. In a "tadpole" type seal embodiment, the intermediate wrap and outer wrap members include outwardly extending tail sections to provide means for attachment to the periphery of a valve housing or the like.

7 Claims, 4 Drawing Figures

HEAT AND VIBRATION RESISTANT SEAL

BACKGROUND OF THE INVENTION

This invention relates generally to valve seals and more particularly to a seal construction suitable for use in a valve or the like which is subjected to elevated service temperatures and vibration.

The valve seal of the present invention finds particular utility in conjunction with valves which are subjected to vibration and high temperatures. In use such valves, for example, may be used to control the direction of flow of the exhaust gases from diesel-powered engines of the type commonly used to power gas pumping stations and compressor stations. In use, these large, reciprocating engines emit a high temperature exhaust gas and, likewise, transmit a relatively high vibration level to the downstream, exhaust duct work. In light of ongoing activities to further conserve energy, many industrial users of such equipment have taken steps to install heat recovery units in an effort to capture some of the waste heat carried off by the exhaust gases emitting therefrom. In such installations which utilize such heat recovery systems, it is desirable to divert some or all of the exhaust gases emanating from the engine to the heat recovery system by way of appropriate valves in the exhaust duct work. The valve system diverts a portion of the exhaust gases to the heat recovery system or to the exhaust muffler system. In the event the heat recovery system requires maintenance due to breakdown or the like, the valve system is completely closed in order to isolate the heat recovery system from the hot exhaust gases so as to provide a safe environment for the workers performing the maintenance thereon.

Due to the high temperatures and relatively high operating vibrational levels encountered in the exhaust duct work of these engines, it has heretofore been common practice to employ large and expensive valves to control the exhaust gases. These known valves may be of a wide variety of constructions and designs, such as a butterfly valve or a gate valve which employs a heavy sliding metal blade which makes metal to metal contact with the valve seat in order to minimize gas leakage in the closed position. In other words, these commonly used valves do not employ gaskets or other attached sealing strips but rely solely upon the metal to metal contact between the blade and valve seat to achieve a seal.

Such a gasket or sealing strips when used in such an environment must be capable of withstanding vibration and high temperatures and have a high degree of resiliency.

It is generally known in the art of constructing packing or sealing strips to provide a sealing member having a core which contains a soft or resilient material so as to maintain sealing engagement between the mating surfaces to be sealed and which will maintain its resilience under pressure or prevent permanent deformation of the core. For example, U.S. Pat. No. 2,144,082 discloses a composite core of both soft and firm rubber for sealing an automobile door.

When encountering higher service temperatures, the desirability of employing materials which will retain their mechanical properties, such as tensile strength and resiliency at elevated service temperatures. has also been recognized. For example, U.S. Pat. No. 2,882,082 discloses a fire resistant gasket constructed of strips of knitted metal mesh fabric and metal foil suitable for use in the fire walls of jet engine aircraft.

Combinations of high temperature materials have also been utilized. In U.S. Pat. No. 3,578,764, a gasket construction for sealing the door of a self-cleaning oven is disclosed having a tubular metal mesh core sheathed by a tubular knit fiberglass fabric which is said to be suitable in temperatures in excess of 900° F.

Of course, the above-mentioned seals are not intended to be subjected to the vibration and abrasion caused by hot exhaust gases and it is doubtful that any of them could function satisfactorily in such an environment for any period of time.

Since a substantial amount of vibration is transmitted to the valve, it is desirable to provide a seal that can withstand that vibration. This is an important requirement since the vibration abrades known sealing material and degrades known seals after a period of time.

In such service conditions it is also desirable to provide a seal which is capable of withstanding high temperatures. In such high temperatures, known seals are subject to degradation. As such a valve seal degrades, it loses its effectiveness and permits substantial leakage through the valve.

It is also desirable that such a seal have a high degree of resiliency, that is, the capability of returning to its original state after compression thereof. When a valve is moved to a closed position and the sealing material is compressed, its sealing effectiveness increases and minimizes the amount of leakage through the valve. When the valve is subjected to a substantial amount of vibration, there is a certain amount of "fluttering" that may occur as a result of the pulsating pressure. When the valve is provided with a seal having a high degree of resiliency, a sealing relationship is maintained between the valve body and the valve blade since the sealing material stays in contact with both of the valve members even though some slight movement may occur therebetween. It should be further understood that this "fluttering" further acts to abrade the sealing material and degrade it as described herein.

In dealing with the high temperatures and high vibration levels encountered in the exhaust duct work of diesel-powered pumps and compressors and the like, the prior art has failed to develop or suggest a seal construction which can successfully withstand this severe service environment without early degradation and failure. It has been found that the seal construction of the present invention exhibits superior sealing characteristics over known high temperature seals without degradation due to abrasion and vibration.

SUMMARY OF THE PRESENT INVENTION

The present invention provides a seal construction exhibiting improved heat and vibration resistance compared with the seals and gaskets of the prior art and, in addition, when utilized with a valve, the invention provides a valve of improved performance requiring less maintenance than the valves heretofore used.

The present invention further provides a seal construction having very high heat resistance in the area of 1600°-2300° F. and high vibration and abrasion resistance, and is capable of retaining its resiliency and sealing effectiveness over a long service life under relatively severe operating conditions.

The seal construction of the present invention achieves the above-mentioned desirable features by providing a core member constructed of a dense, resilient material having spring-like properties at elevated service temperatures and an intermediate wrap member of braided, ceramic fiber material which forms a co-extensive cover around the core. Finally, an outer wrap having at least one layer of braided wire metal mesh forms a co-extensive cover around the intermediate wrap member. In operation, the dense, wire mesh inner core maintains its flexibility and spring-back characteristics at elevated temperatures while the intermediate, braided, ceramic wrap helps to contain the circular cross-sectional shape of the inner core and also minimizes leakage at elevated temperatures. The outer wrap member contains the core and intermediate wrap members to prevent breakdown of the ceramic fibers due to vibration and abrasion.

BRIEF DESCRIPTION OF THE DRAWINGS

For a better understanding of the present invention, which is described in greater detail hereinafter, reference is made to the appended drawings, in which.

DETAILED DESCRIPTION OF THE INVENTION

Figure 1:
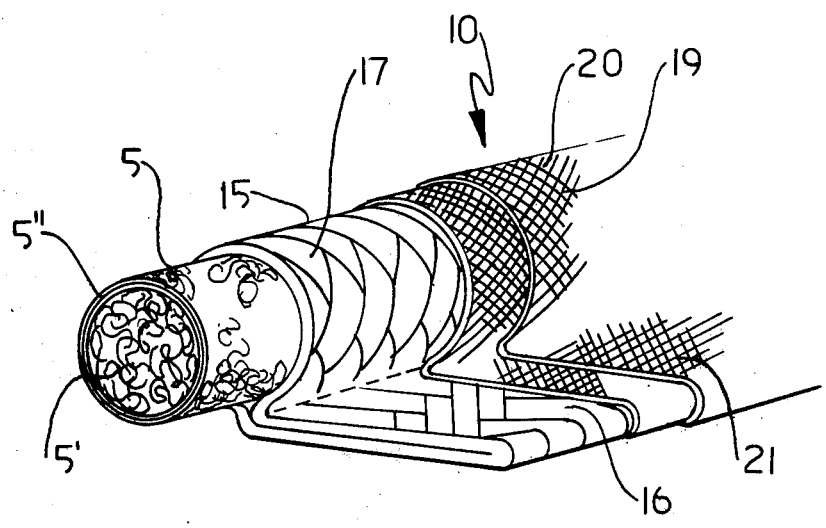
FIG. 1 is a perspective, fragmentary view of a preferred embodiment of the invention.

Referring now more specifically to the drawings and in particular to FIG. 1, a preferred embodiment of the seal member of the present invention, generally designated at 10, is depicted in fragmentary form. The embodiment showin in FIG. 1 is in the form of a so-called "tadpole" type seal which derives its name from the fact that a cylindrical portion 19 and a tail portion 21 of the seal 10 generally resemble the shape of a tadpole when viewed from the end. Seal 10 has an inner core member 5, constructed of dense, metal wire mesh or ceramic rope. The inner core 5 is surrounded by an intermediate wrap member 15 which is constructed of braided, ceramic fiber, preferably of an alumina-boria-silica composition. Finally, an outer wrap member 20 fromed of a braided, wire metal mesh forms a co-extensive cover around intermedidate wrap 15. The functions, characteristics and mechanical interactions between these three distinct elements will be discussed in detail hereinafter.

It should be understood that the particular materials used in constructing a seal 10 of the present invention, is dependent upon the service conditions in which the seal will be used. In general, when it is necessary to operate the seal 10 in elevated temperatures, more expensive materials with superior temperature characteristics must be utilized. The present invention is hereinafter described in connection with several commercially available materials and are used in combination with each other to achieve the desired performance while minimizing the cost of the seal. It should also be understood that it is within the contemplation of this invention to use other materials having the necessary operating temperature, resiliency and resistance to abrasion properties necessary under the service conditions which they may be exposed to.

Core 5 is constructed of a dense, metal wire mesh, preferably of Inconel alloy in the highest temperature embodiment. Other materials may be utilized for core 5, such materials being characterized by their ability to retain resiliency under load and spring-back characteristics at a given service temperature. In addition to Inconel, which can withstand service temperatures of between 2300° F. and 2400° F., other materials such as 316 stainless steel dense, wire mesh and ceramic rope have been acceptable for use as a material in core 5. 316 stainless steel has been successfully used in extended service up to 1600° F. and ceramic rope material has been employed at a service temperatures up to 2200° F.

The material utilized for the core 5 is shaped into a generally circular cross-sectional configuration and has flexibility and spring-back characteristics when subjected to compressive loading at a given service temperature. When, for example, the core 5 is constructed from Inconel or 316 stainless steel material, the flat, mesh material is tightly rolled upon itself to form a desired core thickness as shown as the inner core portion 5' in FIG. 1.

Two outer metal mesh jackets or sleeves 5" are then positioned around the inner core portion 5' to retain its circular shape. The jackets 5" are preferably made from Inconel wire mesh or from 316 stainless steel mesh so as to match the pre-selected material of the inner core portion 5'. It is desirable that the thermal expansion characteristics of the inner core portion 5' and the outer core sleeves 5" be the same. The wire diameter of the mesh material for the inner core portion 5' and the outer core sleeves 5" is preferably about 0.006 inches with the inner core portion 5' having a mesh density of about 60 or approximately 6 to 7 courses per inch. The outer core sleeves 5" also are about 0.006 inches in wire diameter but have a denser knit of about 130 or approximately 13–15 courses per inch.

This composition of the inner core 5 is particularly desirable as not only maintaining resiliency under compressive loading but also providing a good high temperature gas barrier in operation. It should be clearly understood that other materials have the same properties and may be used as the core 5 in a seal of the present invention.

Figure 2:
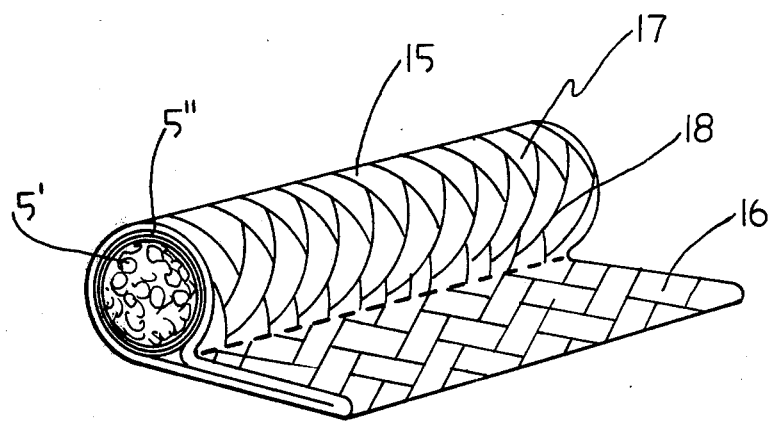
FIG. 2 is a perspective view of the intermediate cover member showing the core member in place.

Referring now to FIG. 2, a longitudinal section of inner core 5 is shown as it would appear when an intermediate cover member 15 is applied thereto. The intermediate cover 15 has a generally cylindrical portion 17 which extends around the outside of the outer portion 5" of the inner core 5. The intermediate cover 15 also has an outwardly extending portion 16 which forms the tail of the tadpole seal embodiment. As will be hereinafter described, the tail 16 forms a portion of the means for attaching seal 10 to a seating surface of a valve.

In a preferred embodiment, the intermediate cover member 15 is constructed of a braided, ceramic fiber sleeving material, preferably a product manufactured by 3M Company under the trademark "Nextel"312. Nextel is a commercially available, woven fabric made from alumina-boria-silica composition ceramic fibers. Published data indicates that Nextel 312 is suitable for extended use at temperatures up to 2600° F. with short uses up to 3000° F. As shown in FIG. 2, a test sample of intermediate cover member 15 of Nextel 312 braided ceramic fiber sleeving material having a thickness of 0.024 inches was applied snuggly around the core member 5 to form the cylindrical section 17 and thence outwardly to form the tail section 16.

Figure 4:
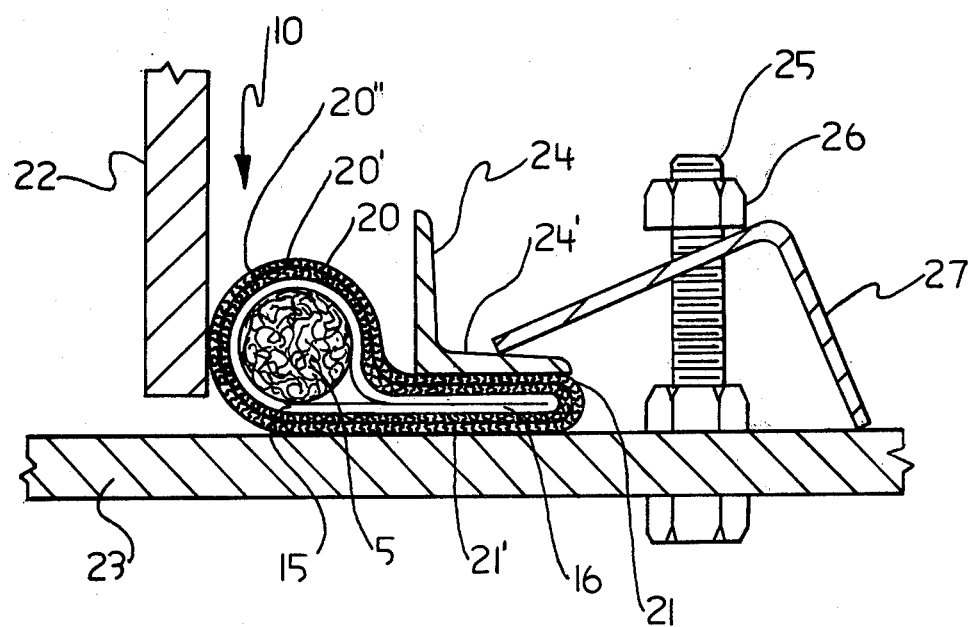
FIG. 4 is a partial, cross-sectional side view of a preferred embodiment of the invention mounted within a valve.

In order to maintain a snug fit between intermediate cover 15 and inner core 5 and to allow for ready installation of the seal 10 as will be hereinafter described, the intermediate cover 15 was sewn with a 0.006 inch diameter, alpha quartz high temperature teflon coated sewing thread at seam 18 extending longitudinally between cylindrical section 17 and tail section 16 thus forming a completed assembly of intermediate cover 15. Other, less expensive, sewing threads, such as metal wire, nylon, cotton or the like may be used to form seam 18, since after seal 10 is clamped into place, as shown in FIG. 4, the integrity of the seal no longer depends upon seam 18 and it is thus unimportant if the thread of seam 18 disintegrates thermally.

Intermediate cover member 15 functions to contain the shape and integrity of inner core 5 and minimizes gas leakage during operation. Hence, in a high temperature and high vibration service environment, intermediate cover 15 must not only exhibit good thermal properties but must also be capable of maintaining some ductility and flexibility when subjected to vibration. In other words, the material selected for intermediate cover 15 should not become brittle due to thermal degradation so that it breaks down and disintegrates when subjected to vibration and abrasion at high gas velocity flow rates.

As stated, the Nextel 312 material has been found to be suitable for this application in that it may be used in environments up to 2600° F. without thermal degradation. Other commercially available materials, such as fiberglass, braided sleeving materials, may also be employed for lower temperature, high vibration service applications. For example, commercially available glass braided sleeving materials may be utilized at temperatures ranging from up to 1000° F. to 1400° F. These fiberglass materials, while not providing the higher temperature service of Nextel do, however, afford some cost savings for lower temperature applications.

Figure 3:
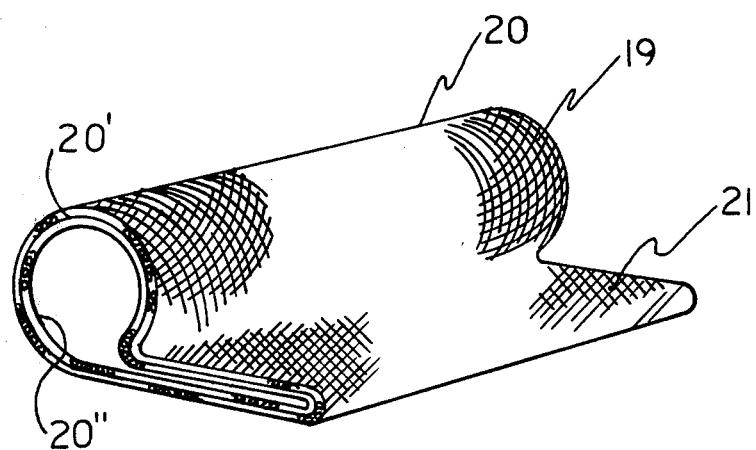
FIG. 3 is a perspective view of the outer wrap member.

Referring now to FIG. 3, the outer wrap member 20 is depicted as a longitudinally extending segment, similar to the intermediate cover 15 shown in FIGS. 2 and 3, suitable for use in a tadpole seal construction. The outer wrap 20 is formed from a high temperature resistant, metal braided wire material, such as Inconel alloy or 316 stainless steel. Once again, the selection of material is dependent upon the service temperature anticipated. In the tadpole embodiment shown, the outer wrap 20 includes a cylindrical section 19 and an outwardly extending tail section 21. The outer wrap 20 preferably has two layers 20' and 20" of wire mesh braided sleeving surrounding and co-extensive with the intermediate cover 15.

As can be seen, the outer wrap 20, in the area of the cylindrical portion 19, surrounds the intermediate cover 15 to provide a protective barrier for the intermediate cover 15 against vibration, abrasion, and high velocity gas flow within the exhaust duct work. It has been noted during experimental test work, that the outer wrap 20 greatly enhances the ability of the intermediate cover 15 to withstand degradation due to high vibration levels at elevated temperatures.

In this regard, it is preferred to utilize two individual layers 20' and 20" of wire metal mesh braided sleeving as the outer wrap 20. It is theorized that the innermost layer 20" aids in dampening the vibration level at the interface between the sleeve 20" and the intermediate cover 15. It is further believed that the greatest oscillating vibratory forces are received by the outer layer 20' and that such forces are subsequently and substantially dampened as they are transmitted from the outer layer 20' and thence to the inner lay 20" prior to being transmitted to the intermediate cover 15. For whatever reason, it has been noted during testing that outer wrap 20 succeeds in performing a very worthwhile function by protecting intermediate cover 15 from the high vibration levels and abrasion encountered in an exhaust duct between a reciprocating diesel-powered engine and a heat recovery unit.

The outer wrap 20 is preferably constructed of an Inconel alloy braided wire metal mesh which is capable of withstanding temperatures of up to 2300° F. for extended service life. 316 stainless steel or other high temperatures alloy braided wire metal mesh may also be employed for the outer wrap 20. With 316 stainless steel, the seal 10 can withstand a service temperature of up to 1600° F. As stated, it is preferred that the outer wrap 20 be comprised of two layers 20' and 20" of braided metal mesh. However, the outer wrap 20 may also be formed from a single layer of such braided metal mesh material or from a single layer of commercially available, double braided high temperature wire metal mesh. In either case, the Inconel alloy or 316 stainless steel braided mesh material is similar to the metal braided mesh material comprising inner core 5'. Preferably, the wire diameter is about 0.006 inches and the knitted density is between 60 and 130 or 6 to 15 courses per inch.

An actual sample of a tadpole seal of the type shown in the drawings was constructed and tested under cyclic service conditions in a butterfly type valve on the exhaust side of a Cooper-Bessemer reciprocating diesel engine having twelve cylinders and running at 350 RPM's. The tadpole seal 10, as seen in FIG. 4, is secured to the throat 23 of the butterfly valve 30 by way of an angle iron 24 and its cooperating clamp 27. The portion 24' of the angle iron 24 compressively engages the tail portion 21 of the tadpole seal 10 which in turn compressively forces the lower tail surface of the section 21' in sealing engagement with the throat seating section of the butterfly valve 23.

In the closed position, the blade 22 of the butterfly valve 23 compressively engages the outer wrap 20 of the tadpole seal 10. As shown, retaining clamps 27 are compressively held in place by way of a threaded bolt 25 and an engaging nut 26 within the interior of the butterfly valve 30.

The tadpole seal embodiment of the present invention was tested in the butterfly valve 30 for a period of thirty days under cyclic conditions equivalent to almost 3 years of service and exhibited no thermal, vibration or abrasion degradation after the thirty-day period. The seal also maintained a leakage rate of less than 0.25%. Concurrently, a similar tadpole type seal was tested under the same service conditions; however, this seal did not have the outer wrap member 20. This latter seal failed within a relatively short period of time apparently due to the high gas velocity and vibration encountered in this service environment. Thus, the seal construction of the present invention withstood the deleterious effects of high temperature, high vibration environment without degradation and was capable of sealing the exhaust gas stream in an isolation mode at levels acceptable for human safety (i.e. gas leakage less than 0.25%) which obviates the necessity of employing the expensive and high maintenance metal to metal gate seals heretofore used for this application.

In the above-described tadpole style seal which was successfully tested, the inner core 5 was approximately one-half inch in diameter, the intermediate Nextel 312 cover member was approximately one thirty-second of an inch in thickness forming an outer diameter 17 of approximately nine sixteenths of an inch; and the outer wrap 20 containing two layers of braided Inconel metal mesh formed an outer diameter 19 of five eights of an inch with the tail section 21 outwardly extending therefrom about one inch.

Several examples of preferred material combinations for use in the seal of the present invention at given service temperatures between 1600° F. and 2300° F. are as follows:

EXAMPLE 1

| | | |
|---|---|---|
| PERFORMANCE: | Continuous service temperature | 2300° F. |
| | Short term use temperature | 2500° F. |
| | Maximum velocity 8,000 feet per minute gas flow | |
| MATERIAL COMPOSITION: | | |
| INNER CORE: | Dense inconel metal wire mesh core ½" in diameter. | |
| | Extended use temperature | 2300° F. |
| | Short term use temperature | 2400° F. |
| | Melt temperature | 2500° F. |
| INTERMEDIATE COVER: | Nextel 312 ceramic braided fibers of alumina-boria-silica composition, 9/16" in diameter hollow sleeve | |
| | Extended use temperature | 2600° F. |
| | Short term use temperature | 3000° F. |
| | Melt temperature | 3272° F. |
| OUTER WRAP: | Inconel double braided wire metal mesh outer hollow sleeve cover ⅝" in diameter with a 1" doubled tail with sealing tab. | |
| | Extended use temperature | 2300° F. |
| | Short term use temperature | 2400° F. |
| | Melt temperature | 2500° F. |

EXAMPLE 2

| | | |
|---|---|---|
| PERFORMANCE: | Continuous service temperature | 2200° F. |
| | Short term use temperature | 2300° F. |
| | Maximum velocity 8,000 feet per minute gas flow. | |
| MATERIAL COMPOSITION: | | |
| INNER CORE: | Ceramic rope core ½" in diameter. | |
| | Extended use temperature | 2200° F. |
| | Short term use temperature | 2400° F. |
| INTERMEDIATE COVER: | Nextel 312 ceramic braided fibers of alumina-boria-silica composition, 9/16" in diameter hollow sleeve. | |
| | Extended use temperature | 2600° F. |
| | Short term use temperature | 3000° F. |
| | Melt temperature | 3272° F. |
| OUTER WRAP: | Inconel double braided wire metal mesh outer hollow sleeve cover - ⅝" in diameter with a 1" doubled tail with sealing tab. | |
| | Extended use temperature | 2300° F. |
| | Short term use temperature | 2400° F. |
| | Melt temperature | 2500° F. |

EXAMPLE 3

| | | |
|---|---|---|
| PERFORMANCE: | Continuous service temperature | 1600° F. |
| | Short term use temperature | 1800° F. |
| | Maximum velocity 8,000 feet per minute gas flow | |
| MATERIAL COMPOSITION: | | |
| INNER CORE: | 316 stainless steel dense wire mesh core ½" in diameter. | |
| | Extended use temperature | 1600° F. |
| | Short term use temperature | 1800° F. |
| | Melting point | 2500° F. |
| INTERMEDIATE COVER: | Nextel 312 ceramic braided fibers of alumina-boria-silica composition, 9/16" in diameter hollow sleeve. | |
| | Extended use temperature | 2600° F. |
| | Short term use temperature | 3000° F. |
| | Melting point | 3272° F. |
| OUTER WRAP: | 316 stainless steel braided wire metal outer hollow sleeve cover ⅝" in diameter with a 1" doubled tail with sealing tab. | |
| | Extended use temperature | 1600° F. |
| | Short term use temperature | 1800° F. |
| | Melting temperature | 2500° F. |

While the preferred tadpole embodiment has been shown and described, it is also appreciated that variations such as a tailess arrangement in the form of a gasket could also be formed without departing from the spirit of the invention and the scope of the appended claims. It should also be understood that it is within the contemplation of the present invention that the core 5 and complimentary covering portions of the intermediate wrap member 15 and outer wrap member 20 may have a cross-sectional configuration other than a circular configuration. Such configurations may be dictated by a wide variety of factors including the shape of the opposing seat portions of the valve in which the seal is used in connection with and if desired, to form an improved sealing relationship between the valve components.

Having described my invention, I claim:

1. A heat and vibration resistant seal construction comprising:
   a. a core member constructed of a dense, resilient material having spring-like properties at elevated service temperatures;
   b. an intermediate wrap member constructed of a fiber material having an alumina-boria-silica composition, said intermediate wrap member forming a co-extensive cover for said core; and
   c. an outer wrap member of at least one layer of braided wire metal mesh forming a co-extensive cover around said intermediate wrap member.

2. The seal construction of claim 1 wherein said core member is a material selected from the group consisting of stainless steel, Inconel alloy, and ceramic material.

3. The seal construction of claim 1 in which said outer wrap member includes a plurality of layers of braided wire mesh.

4. The seal construction of claim 3 wherein said outer wrap member comprises two layers of Inconel alloy braided wire metal mesh.

5. The seal construction of claim 1 in which said outer wrap member has a tail section outwardly extending therefrom to provide a clamping surface for said seal.

6. The seal construction of claim 1 in which said core member includes an inner portion of woven wire and an outer portion of at least one sleeve of braided wire mesh surrounding said inner portion of said core member.

7. A heat and vibration resistant seal construction comprising:
   a. a core member constructed from a material selected from the group consisting of stainless steel, Inconel alloy and ceramic material;
   b. an intermediate wrap member constructed of a fiber material having an alumina-boria-silica composition, said intermediate wrap member coextensively formed around said core member and including an outwardly extending tail section; and
   c. an outer wrap means constructed of a plurality of layers of wire mesh constructed from a material selected from the group consisting of stainless steel and Inconel wire, said outer wrap means forming a co-extensive cover around said intermediate wrap member and including an integral tail section outwardly extending over and around said tail section of said intermediate cover member for attaching said seal to the sealing surface of a valve means.

* * * * *